United States Patent [19]

Takahashi et al.

[11] Patent Number: 4,559,461
[45] Date of Patent: Dec. 17, 1985

[54] STEPPING MOTOR

[75] Inventors: Akira Takahashi, Gyoda; Kenji Matsui, Konosu; Hajime Suzuki, Kawasaki, all of Japan

[73] Assignee: Jeco Company Limited, Tokyo, Japan

[21] Appl. No.: 631,641

[22] Filed: Jul. 17, 1984

[30] Foreign Application Priority Data

Jul. 19, 1983 [JP] Japan ............................ 58-111982[U]

[51] Int. Cl.⁴ ............................................ H02K 37/00
[52] U.S. Cl. .................................... 310/49 R; 310/90; 310/259; 308/DIG. 5
[58] Field of Search ................ 310/49 R, 90, 40 MM, 310/162, 163, 164, 44, 156, 67 A, 268, 257, 42, 112, 258, 259; 384/279; 308/DIG. 5

[56] References Cited

U.S. PATENT DOCUMENTS

| | | | |
|---|---|---|---|
| 2,669,491 | 2/1954 | Haller | 308/DIG. 5 |
| 2,814,746 | 11/1957 | Boerdijk | 310/164 |
| 3,109,684 | 11/1963 | Tupper | 384/279 |
| 3,219,862 | 11/1965 | Kieffert | 310/257 |
| 3,671,841 | 6/1972 | Hoffmann | 310/156 |
| 3,803,430 | 4/1974 | da Costa | 310/40 MM |
| 4,207,483 | 6/1980 | Baer | 310/49 R |
| 4,371,220 | 2/1983 | Bruchner | 308/DIG. 5 |

FOREIGN PATENT DOCUMENTS 0047886 3/1982 Japan ............................ 310/90

Primary Examiner—R. Skudy
Attorney, Agent, or Firm—Roberts, Spiecens & Cohen

[57] ABSTRACT

A stepping motor includes a rotary shaft, a rotor magnetized in an axial direction thereof and having a plurality of magnetic poles arranged in a circumferential direction thereof with different poles in alternation, inner yokes each having a plurality of projections and depressions, outer yokes each having a plurality of projections and depressions which are separated from and oppose the depressions and projections of the corresponding inner yoke in a plane perpendicular to the axial direction, coils for magnetizing the inner and outer yokes to assume mutually different magnetic poles, and oil impregnated bearings made from a ferromagnetic material. The bearings each unitarily comprise a bearing part for supporting the rotary shaft, and a core part having an outer side thereof surrounded by one of the coils.

4 Claims, 3 Drawing Figures

U.S. Patent   Dec. 17, 1985   4,559,461
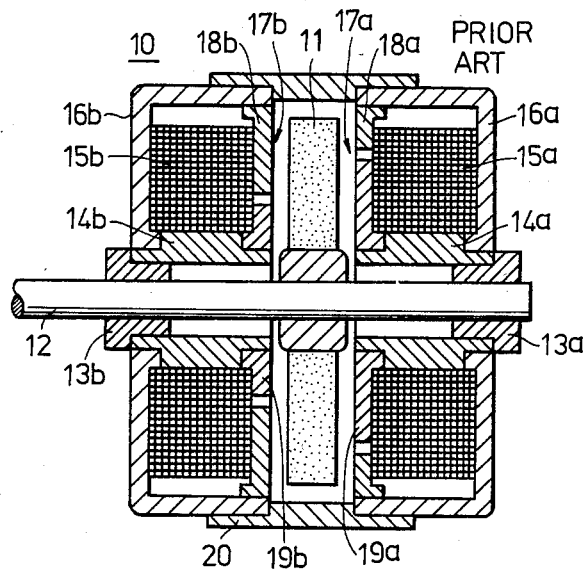
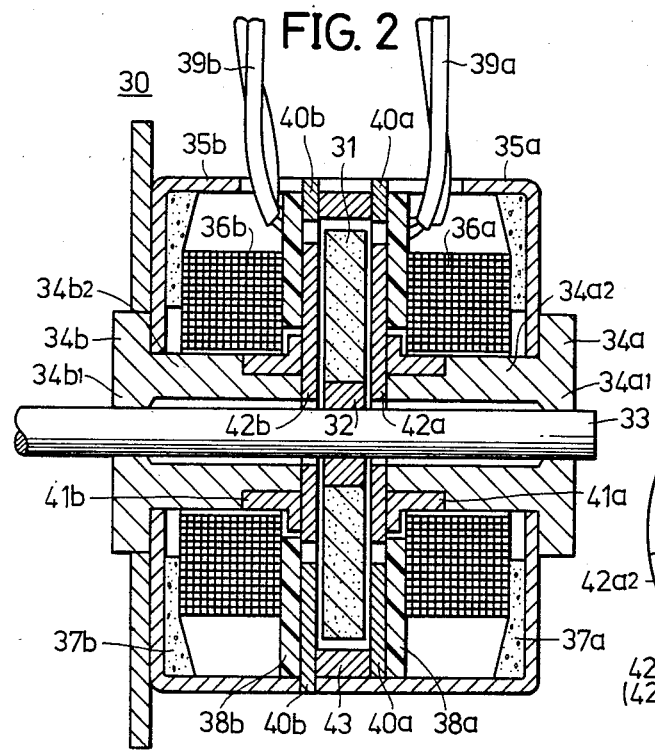
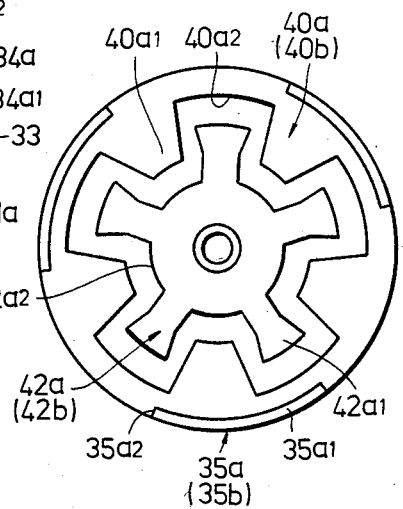

STEPPING MOTOR

BACKGROUND OF THE INVENTION

The present invention generally relates to stepping motors, and more particularly to a stepping motor in which a core and a bearing are made from the same member.

One of the present inventors has previously proposed a flat type stepping motor in a Japanese Laid-Open Utility Model Publication No. 57-47886. This previously proposed stepping motor comprises a rotor having a disc shape, bearings for supporting a rotary shaft of the rotor, cores fitted over the outer peripheries of the respective bearings and having coils wound thereon, and stators each having inner and outer yokes. The rotor is magnetized in the thickness direction thereof, and has a plurality of magnetic poles arranged in the circumferential direction thereof with the different poles in alternation. The inner and outer yokes of each stator are arranged so that projections of the inner and outer yokes are separated from and oppose corresponding depressions of the outer and inner yokes, where both the inner and outer yokes have the projections and the depressions in alternation in radial direction. This previously proposed stepping motor uses oil impregnated bearings having non-magnetic copper as the base. The cores having coils wound thereon, are cylindrical and are made of a ferromagnetic material. These cores are fitted over the outer periphery of the bearings.

There is a general demand to downsize the flat type stepping motor. However, the cores must each have a cross sectional area to a certain extent so that the magnetization does not become saturated by the magnetic fields which are generated by the coils. Thus, the diameters of the cores which are fitted over the bearings cannot be reduced, and thee is a limit to the downsizing of the flat type stepping motor. Further, because the bearings and the cores are made of independent members, the number of parts is large and there is a problem in that the productivity is poor.

SUMMARY OF THE INVENTION

Accordingly, it is a general object of the present invention to provide a novel and useful stepping motor in which the problems described heretofore have been eliminated.

Another and more specific object of the present invention is to provide a stepping motor in which the core and bearing are made from the same member i.e. the bearing is also used as the core. According to the stepping motor of the present invention, it is possible to reduce the outer diameter of the core part compared to the conventional stepping motor having the cores fitted over the bearings, while maintaining the cross sectional area of the core part the same as that of the conventional stepping motor. Thus, it is possible to reduce the external size of the stepping motor. On the other hand, when the external size of the stepping motor is maintained the same as that of the conventional stepping motor, it is possible to reserve a large space for the coils and increase the number of windings without reducing the line diameter of the windings. Hence, it is possible to increase the ampere turns of the coils without increasing the coil resistances to a large extent, and improve the output torque of the motor. In addition, since the bearing and the core are made from a single member, the number of parts is small and the assembling of the stepping motor is facilitated. As a result, the productivity is improved, and the stepping motor can be manufactured at a low cost.

Other objects and further features of the present invention will be apparent from the following detailed description when read in conjunction with the accompanying drawings.

BRIEF DESCRIPTION OF THE DRAWINGS

FIG. 1 is a view in cross section showing a conventional stepping motor;

FIG. 2 is a view in cross section showing an embodiment of a stepping motor according to the present invention; and FIG. 3 is an elevation view showing a stator part of the stepping motor shown in FIG. 2.

DETAILED DESCRIPTION

First, a general description will be given with respect to a conventional stepping motor 10 by referring to FIG. 1. In FIG. 1, a rotor 11 is magnetized in the thickness direction thereof and has a plurality of magnetic poles arranged in the circumferential direction thereof with the different poles in alternation. A rotary shaft 12 of the rotor 11 is supported by oil impregnated bearings 13a and 13b which have non-magnetic copper as the base. Cores 14a and 14b are fitted over the respective bearings 13a and 13b. Coils 15a and 15b are wound around the respective outer peripheries of the cores 14a and 14a. In addition, yokes 16a and 16b each having the shape of a cup, are mounted on the respective cores 14a and 14b. Outer stators 18a and 18b are fixed on respective the yokes 16a and 16b, and inner stators 19a and 19b are fixed on the respective cores 14a and 14b. The outer stator 18a and the inner stator 19a constitute a stator 17a, and the outer stator 18b and the inner stator 19b constitute a stator 17b. The separation of the yokes 16a and 16b are restricted by a spacer 20.

In the conventional stepping motor 10, the cores 14a and 14b are fitted over the respective bearings 13a and 13b, and the outer diameter of the cores 14a and 14b cannot be reduced under a certain extent. Further, the core 14a and the bearing 13a are independent members, and the cores 14b and the bearing 13b are also independent members. As a result, the conventional stepping motor 10 suffered the disadvantages described before.

An embodiment of a stepping motor according to the present invention, which has eliminated these disadvantages, will now be described in conjunction with FIG. 2. In FIG. 2, a rotor 31 of a stepping motor 30 is magnetized in the thickness direction thereof and has a plurality of magnetic poles arranged in the circumferential direction thereof with the different poles in alternation. The rotor 31 is fixed to a rotary shaft 33 through a bush 32. The rotary shaft 33 is supported by a pair of bearings 34a and 34b which constitute an essential part of the stepping motor according to the present invention.

The bearings 34a and 34b are oil impregnated bearings having ferromagnetic iron as the base. The bearing 34a comprises an end bearing part 34a1 for directly and radially supporting the rotary shaft 33, and a central hollow cylindrical core part 34a2, which are unitarily made from a single member. Similarly, the bearing 34b comprises an end bearing part 34b1 for directly and radially supporting the rotary shaft 33, and a central hollow cylindrical core part 34b2, which are unitarily made from a single member. The material from which the bearings 34a and 34b are made, may be a material SBF2118 determined under the Japan Industrial Standard (JIS) No. B1581 (oil impregnated metal powder sintered bearing). The base of the material SBF2118 is pure iron and includes 3% or less copper, and the bearings 34a and 34b in this case are oil impregnated metal powder sintered bearings.

Yokes 35a and 35b which also serve as cases each having the shape of a cup, are fitted over the respective bearings 34a and 34b. Ring-shaped coil bodies 36a and 36b are provided within the respective yokes 35a and 35b, in a state encircling the respective outer peripheries of the core parts 34a2 and 34b2 of the bearings 34a and 34b. The coil bodies 36a and 36b are sandwiched between respective rubber supports 37a and 37b and respective insulating plates 38a and 38b. Lead wires of the coil bodies 36a and 36b are coupled to respective cables 39a and 39b, through respective printed terminal parts (not shown) of the insulating plates 38a and 38b.

Outer yoke plates 40a and 40b engage with and are mounted on the respective yokes 35a and 35b, in a mutually opposing state. As shown in FIG. 3, the outer yoke plate 40a (40b) comprises projections 40a1 and depressions 40a2 which face toward the center of the outer yoke plate 40a (40b). Ring-shaped yokes 41a and 41b are fitted over the respective cores 34a and 34b, and inner yoke plates 42a and 42b are mounted on respective edge surfaces of cores 34a and 34b and the yokes 41a and 41b. As shown in FIG. 3, the inner yoke plate 42a (42b) comprises radially and outwardly extending projections 42a1 and depressions 42a2. The outer yoke plate 40a and the inner yoke plate 42a are arranged on the same plane, and the outer yoke plate 40b and the inner yoke plate 42b are also arranged on the same plane. The combination of the outer and inner yoke plates 40a and 42a and the combination of the outer and inner yoke plates 40b and 42b each constitute a stator. The yoke 35a comprises projections 35a1 and depressions 35a2 in a direction parallel to a relative center axis thereof, and the yoke 35b comprises depressions and projections complementary to the projections 35a1 and the depressions 35a2 of the yoke 35a. The yokes 35a and 35b are assembled together in a state where a gap between the outer yoke plates 40a and 40b and a gap between the inner yoke plates 42a and 42b are respectively restricted to a predetermined separation, by a ring-shaped spacer 43 which is disposed between the outer yoke plates 40a and 40b.

Prior to assembling the yokes 35a and 35b, one end of the rotary shaft 33 having the rotor 31, is inserted into the bearing part 34a1 of the bearing, and the other end of the rotary shaft 33 is inserted into the bearing part 34b1 of the bearing 34b. When the yokes 34a and 35b are assembled together in this state where both ends of the rotary shaft 33 are inserted into the respective hearing parts 34a1 and 34b1 of the bearings 34a and 34b, the rotor 31 becomes positioned within the space which is restricted by the spacer 43. The yoke plates 40a and 40b and the yoke plates 41a and 41b are magnetized and assume mutually different magnetic poles, when a current is applied to the coils 36a and 36b.

As described before, the bearing part 34a1 and the core part 34a2 of the bearing 34a are unitarily made from a single member, and the bearing part 34b1 and the core part 34b2 of the bearing 34b are unitarily made from a single member. Hence, compared to the conventional stepping motor in which the cores and the bearings are constituted from independent members and the cores are fitted over the respective bearings, the outer diameters of the core parts 34a2 and 34b2 can be reduced by amounts corresponding to the thicknesses conventionally required to fit the cores over the bearings, while maintaining the cross sectional areas of the core parts 34a2 and 34b2 the same as those of the conventional cores. The cores or the core parts must have certain volumes so that the magnetization will not become saturated by the magnetic fields generated by the coils, and there is a limit in the reduction of the outer diameters of the cores or core parts. For example, in a case where the cross sectional areas of the cores 14a and 14b of the conventional stepping motor 10 shown in FIG. 1 are respectively equal to 23 mm$^2$, the outer diameters of the cores 14a and 14b are respectively equal to 7 mm. On the other hand, in a case where the cross sectional areas of the core parts 34a2 and 34b2 of the stepping motor 30 according to the present invention shown in FIG. 2 are respectively equal to 23 mm$^2$, the outer diameters of the core parts 34a2 and 34b2 are respectively equal to 6 mm. In this case, the diameter of the rotary shaft 33 is equal to 2 mm, and the inner diameters of the core parts 34a2 and 34b2 are respectively equal to 2.6 mm. Therefore, when the cross sectional areas of the core parts 34a2 and 34b2 are the same as those of the conventional cores 14a and 14b and the magnetic circuit characteristic of the stepping motor 30 is the same as that of the conventional stepping motor 10, it is possible to reduce the outer diameters of the core parts 34a2 and 34b2 compared to those of the conventional cores 14a and 14b. Accordingly, the space for accommodating the coil bodies 36a and 36b can be increased by the amounts the outer diameters of the core parts 34a2 and 34b2 are reduced. The number of windings can be increased when the line diameter of the windings are kept the same, or the line diameter of the windings can be increased when the number of windings are kept the same. As a result, it is possible to increase the ampere turns of the coils without increasing the coil resistances, and improve the output torque of the motor. Moreover, since the bearing part and the core part are unitarily made from a single member, the number of parts of the stepping motor 30 is small compared to the conventional stepping motor 10. Thus, the control of the parts and the assembling of the stepping motor are facilitated, to improve the productivity and reduce the manufacturing cost of the stepping motor.

Further, the present invention is not limited to the embodiment described heretofore, and various variations and modifications may be made without departing from the scope of the present invention.

What is claimed is:

1. A stepping motor comprising:
   a rotary shaft;
   a rotor magnetized in an axial direction thereof and having a plurality of magnetic poles arranged in a circumferential direction thereof with different poles in alternation;
   inner yokes each having a plurality of projections and depressions;
   outer yokes each having a plurality of projections and depressions which are separated from and oppose the depressions and projections of the corresponding inner yoke in a plane perpendicular to said axial direction;
   coils for magnetizing said inner and outer yokes to assume mutually different magnetic poles; and a plurality of oil impregnated bearings supporting said rotary shaft, each of said bearings being made from a ferromagnetic material and including a portion constituting ferromagnetic core having an outer surface surrounded by a respective one of said coils for magnetic coupling therewith whereby said bearings serve the dual function of bearing support of said shaft and cores of said coils.

2. A stepping motor as claimed in claim 1 in which each said bearing comprises an oil impregnated metal powder sintered bearing having pure iron as the base.

3. A stepping motor as claimed in claim 1 which further comprises further yokes fitted over said bearings, said further yokes each have a cup shape for accommodating one of said coils and are mounted with the corresponding outer yoke on an end portion thereof, and said inner yokes are each mounted adjacent to an end portion of said core part of the corresponding bearing.

4. A stepping motor as claimed in claim 1 in which each of said bearings comprises a central part and an end part, said central part having a hollow cylindrical shape mounted with play between said central part and said rotary shaft, said central part being externally surrounded by a respective one of said coils, said end part engaging and rotatably supporting one end of said shaft.

* * * * *